United States Patent
Peterson et al.

(10) Patent No.: US 9,475,443 B2
(45) Date of Patent: Oct. 25, 2016

(54) AIRBAG ADJUSTMENT BASED ON DRIVER POSITION

(71) Applicant: Lenovo (Singapore) Pte. Ltd., Singapore (SG)

(72) Inventors: Nathan J. Peterson, Durham, NC (US); Arnold S. Weksler, Raleigh, NC (US); Russell Speight VanBlon, Raleigh, NC (US); John Carl Mese, Cary, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 34 days.

(21) Appl. No.: 14/164,793

(22) Filed: Jan. 27, 2014

(65) Prior Publication Data

US 2015/0210237 A1    Jul. 30, 2015

(51) Int. Cl.
*B60R 21/015* (2006.01)
*B60R 21/233* (2006.01)
*B60R 21/01* (2006.01)

(52) U.S. Cl.
CPC ........... *B60R 21/01538* (2014.10); *B60R 2021/01238* (2013.01)

(58) Field of Classification Search
CPC ............... B60R 21/01538; B60R 2021/01238
USPC ............... 701/45; 280/730.1, 734, 735, 729
See application file for complete search history.

(56) References Cited

U.S. PATENT DOCUMENTS

| | | | | |
|---|---|---|---|---|
| 6,094,610 A * | 7/2000 | Steffens, Jr. | ....... | G01G 19/4142 280/735 |
| 6,125,313 A * | 9/2000 | Watanabe | ........... | B60R 21/0132 280/735 |
| 6,139,052 A * | 10/2000 | Preamprasitchai | ..... | B60R 21/16 280/729 |
| 6,422,595 B1 * | 7/2002 | Breed | .................... | B60N 2/002 180/272 |
| 2002/0020990 A1* | 2/2002 | Sinnhuber | ............. | B60R 21/233 280/729 |
| 2015/0317527 A1* | 11/2015 | Graumann | ............... | H04N 7/18 348/148 |

* cited by examiner

*Primary Examiner* — Jerrah Edwards
*Assistant Examiner* — Adam Mott
(74) *Attorney, Agent, or Firm* — Ference & Associates LLC

(57) ABSTRACT

An aspect provides a method, including: capturing, using a sensor, positional information relating to a driver; determining, using a processor, a driver position with respect to an airbag containing component based on the positional information; and adjusting deployment of the airbag based on the determined driver position. Other aspects are described and claimed.

18 Claims, 2 Drawing Sheets

AIRBAG ADJUSTMENT BASED ON DRIVER POSITION

BACKGROUND

While vehicle airbags have greatly increased driver safety, particularly for higher speed collisions, some vehicle passengers are injured more by the airbag deployment itself than they are by the actual collision. This can be based on the passengers leaning forward in their seats, having their fingers wrapped around the steering wheel, being too young (e.g., children), etc. For example, if a driver's fingers are wrapped around the steering wheel, there's the risk of the airbag pinning the driver's thumbs to the steering wheel as it pushes the arms away.

This concern has been recognized and certain solutions proposed for handling potentially dangerous situations. For example, an airbag may be manually de-activated.

BRIEF SUMMARY

In summary, one aspect provides a method, comprising: capturing, using a sensor, positional information relating to a driver; determining, using a processor, a driver position with respect to an airbag containing component based on the positional information; and adjusting deployment of the airbag based on the determined driver position.

Another aspect provides a vehicle, comprising: an airbag containing component; at least one airbag therein; a driver compartment having a seat and a steering wheel; one or more wheels, at least one of said wheels operatively coupled to said steering wheel; a motor that provides motion to the one or more wheels; a sensor that provides input relating to a driver within the driver compartment; a processor operatively coupled to the sensor and the at least one airbag; and a memory device that stores instructions accessible to the processor, the instructions being executable by the processor to: capture, using the sensor, positional information relating to the driver; determine a driver position with respect to the airbag containing component based on the positional information; and adjust deployment of the at least one airbag based on the determined driver position.

A further aspect provides an information handling system, comprising: a processor; a memory device operatively coupled to the processor, wherein the memory device stores instructions accessible to the processor, the instructions being executable by the processor to: capture, using a sensor, positional information relating to a driver; determine a driver position with respect to the airbag containing component based on the positional information; and adjust deployment of the at least one airbag based on the determined driver position.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
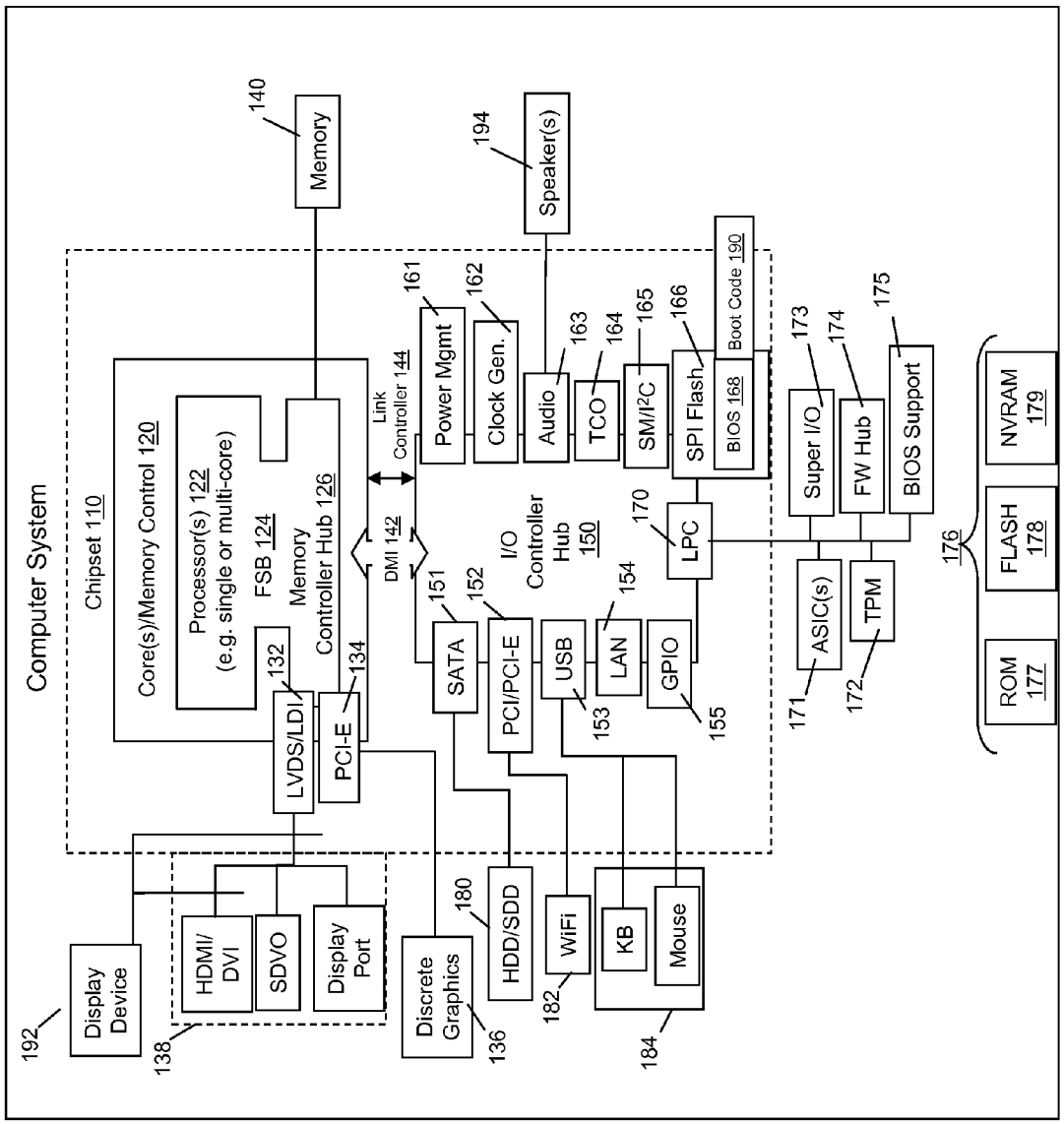
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While manually deactivating an airbag provides a solution to inappropriate airbag deployment it also unnecessarily prevents the airbag from deploying in appropriate situations. Moreover, while some prior approaches attempt a more refined control of airbag deployment, these are not directed to adjustment of airbag deployment generally and do not take into account the actual position/orientation of the driver.

Accordingly, an embodiment provides for airbag adjustment based on the actual position of the driver. It should be noted herein that although the term "driver" is used herein, the aspects of the various embodiments may be applied to passenger compartments and generally to anyone in a position to be contacted by an airbag or airbags. Moreover, while position is used herein, this is a general term, as further described herein, and is inclusive of orientation and contact as well.

An embodiment employs a sensor or sensor(s) to determine driver position and intelligently adjusts airbag deployment in view of the driver's position relative to an airbag containing component. For example, an embodiment may employ a sensor (e.g., a contact sensor, a camera, etc.) on the steering wheel to determine hand placement and/or a three dimensional (3D) camera to determine face or body placement relative to the airbag. Upon detecting a collision, an embodiment may alter or adjust the airbag deployment to minimize impact to, e.g., the driver's hands contacting the steering wheel.

Adjustment of the airbag deployment may include precluding deployment entirely, reducing the rate of deployment, e.g., via modulating the explosive charge, to mitigate impact, e.g., to the face or body, and/or shaping the airbag's deployment. In this respect, a chambered airbag may be utilized to shape the airbag's deployment and/or multiple micro-airbags may be used based on driver positioning, e.g., hand positioning, to eject the airbags that are not directed towards the driver's hands on the steering wheel. Various examples of adjusting airbag deployment are provided herein.

The illustrated example embodiments will be best understood by reference to the figures. The following description is intended only by way of example, and simply illustrates certain example embodiments.

While various other circuits, circuitry or components may be utilized in information handling devices, FIG. 1 depicts a block diagram of an example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, in car display, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 180), a PCI-E interface 152 (for example, for wireless connections 182), a USB interface 153 (for example, for devices 184 such as a digitizer, keyboard, mice, cameras, phones, microphones, storage, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling device circuitry, as for example outlined in FIG. 1, may be included in an in-vehicle computer, e.g., as might be included as an on-board computer in an vehicle such as an automobile including a driver compartment having a seat and a steering wheel, one or more wheels that are operatively coupled to said steering wheel, and a motor that provides motion to the wheels. The device circuitry outlined in FIG. 1, or circuitry similar thereto, may thus be included to provide the functionality described herein with respect to determining driver position, adjustment of airbag deployment, etc., as for example processing inputs of a sensor that provides input relating to a driver within the driver compartment of the vehicle.

Figure 2:
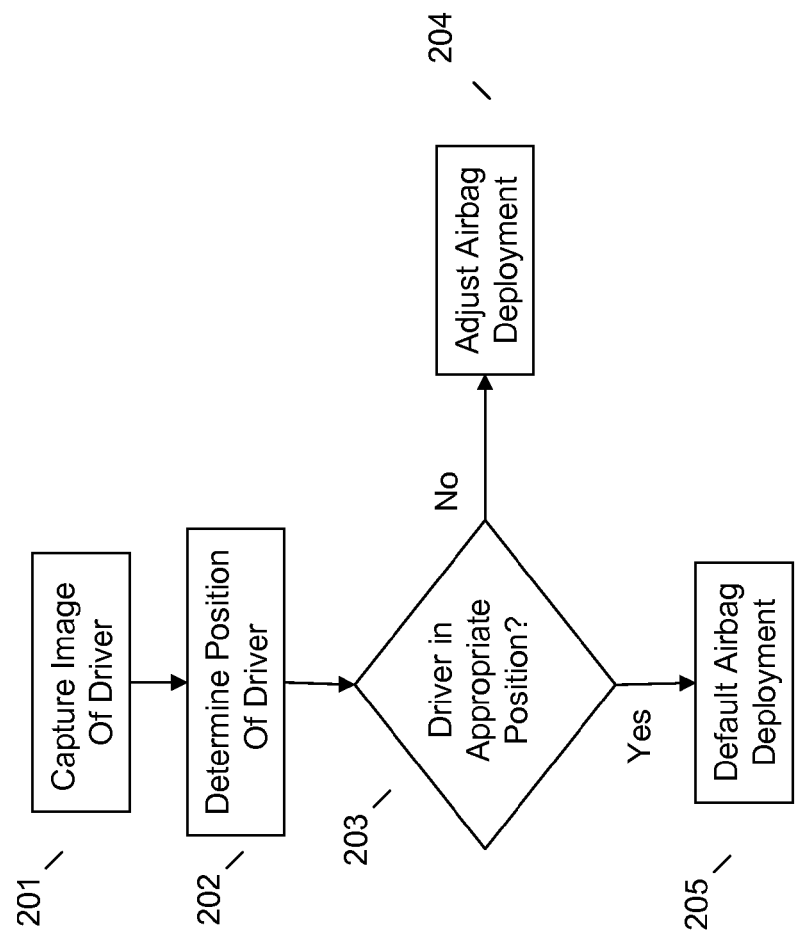
FIG. 2 illustrates an example of adjusting airbag deployment based on driver position.

Referring to FIG. 2, an embodiment may determine a driver's position and, given a real-time (or substantially real-time) determination of driver position, adjust the deployment of an airbag or plurality of airbags appropriately. An embodiment may employ a variety of sensors in determining driver position. An embodiment determines the actual driver position, e.g., directly via use of contact sensors and/or indirectly via image sensors.

For example, an embodiment may employ a camera or other image sensor at 201 to capture images of the driver with respect to an airbag containing component, e.g., a car's steering wheel. Given the input of the sensor(s), an embodiment may determine at 202 the position of the driver dynamically. That is, an embodiment may calculate the position of the driver repeatedly, e.g., as the driver operates the vehicle.

Therefore, an embodiment may determine that a driver has repositioned one or more hands to different locations of the steering wheel, a driver has moved over in a seat, a driver has leaned down to pick something up, etc. Given this information, an embodiment will be aware of the actual driver position on an on-going basis.

An embodiment has access to, e.g., stored in a device memory, a plurality of driver position/orientation mappings and corresponding airbag adjustments. This permits an embodiment to accommodate various driver positions/orientations when deploying an airbag, e.g., in response to a collision as sensed via one or more collision sensors. Thus, an embodiment may proactively make adjustments to an airbag's deployment on an ongoing basis at 204 such that, in the event of a collision, the airbag's deployment is appropriately adjusted. An embodiment may also calculate the adjustment to the airbag following collision sensing, e.g., in the event of a low impact collision and depending on the available processing speed, etc. In the event that a proactive or reactive adjustment is not available, e.g., within a predetermined time of impact or collision sensing, an embodiment may provide a default airbag deployment, e.g., revert to a conventional technique of airbag deployment.

An embodiment therefore may determine, e.g., at 203, if a driver is in an appropriate position for conventional airbag deployment. If so, an airbag may be deployed (or an airbag deployment setting may be maintained) as conventionally known at 205. This may also correspond to maintaining a previously determined airbag adjustment. However, if an embodiment determines that a driver is not appropriately positioned for conventional airbag deployment, e.g., is contacting the steering wheel with one or more hands, is leaning forward, is located within a predetermined distance of the steering wheel or dashboard (in the case of a passenger airbag), an embodiment may adjust airbag deployment at 204. Again, this may include re-determining and re-adjusting a previously determined airbag adjustment.

A variety of airbag deployment adjustments may be utilized. For example, in the case of a single, non-chambered airbag, an embodiment may deactivate the airbag such that it does not deploy in the event of a collision give the determination made at 203. For example, for a low speed collision where the driver is leaning forward, an embodiment may prevent deployment of the airbag in order to prevent damage or injury to the driver via the airbag given the low speed collision and the position/orientation of the driver.

Alternatively or additionally, an embodiment may provide a chambered airbag such that a deployment of the airbag may be shaped, e.g., via deploying exhaust gas to only a sub-set or a single of the plurality of chambers. This may be intelligently mapped such that only chambers determined not to be detrimental to the driver are deployed. For example, using a chambered airbag, an embodiment may not deploy a chamber that would trap or pin a driver's thumb to the steering wheel.

Alternatively or additionally, an embodiment may be implemented using a plurality of airbags for individual or grouped deployment. For example, an embodiment may deploy one or more of the plurality of airbags, and not other(s) of the plurality of airbags, depending on the detected position of the driver, e.g., contact positions with the steering wheel, relative position or orientation of the driver, etc. In this way, an embodiment may utilize selective deployment of smaller airbags to shape the airbag deployment. By way of example, an embodiment may cause one or more airbags to deploy responsive to sensing a collision if this/these airbags are not located at hand-contact positions of the driver with respect to the steering wheel, e.g., as detected by one or more contact sensors, one or more image sensors, a combination of sensor types, etc.

Likewise, an embodiment may not deploy, or deploy with reduced force, one or more other airbags, e.g., located a positions determined to be detrimental for deployment based on the driver's position.

A driver's position may include driver's orientation. For example, in addition to detecting the relative position, e.g., proximate to or away from an airbag containing component such as the steering wheel, dashboard or side passenger side compartment, an embodiment may utilize the driver's orientation to adjust deployment of one or more airbags. For example, an embodiment may determine that a driver has leaned down, e.g., to pick something up, or otherwise shifted his or her orientation with respect to an airbag containing component. Responsive to such a detection, e.g., at 203, an embodiment may adjust the airbag deployment, such as not deploying an airbag responsive to a low impact sensed via an impact or collision sensor and/or adjusting downward the force of deployment and/or shaping the airbag deployment.

As has been described herein, more than one type of sensor input may be utilized in the calculation of the adjustment(s) to airbag deployment(s) and/or the determination of the driver position. Thus, one or more sensor types may be utilized to detect the driver position or orientation, e.g., image sensors, contact sensors and the like. Moreover, additional detections, e.g., of driver and/or passenger identification, e.g., via facial recognition and/or speaker recognition, may be utilized to influence the airbag adjustment settings. Likewise, additional sensors, e.g., speed sensors, impact/collision sensors, and the like may be utilized in combination with the foregoing to influence airbag adjustments, as described herein. Thus, an embodiment may provide different airbag adjustments based on, e.g., speed, in addition to detected driver position and/or orientation.

Accordingly, an embodiment intelligently adjusts airbag deployment on the basis of sensor inputs that permit an embodiment to determine the actual driver (or passenger) position such that the airbag(s) may be deployed to maximum effect without unnecessarily injuring a driver or a passenger. As described herein, in the event that an appropriate determination cannot be made, e.g., of driver position in a timely manner, an embodiment may default to more conventional mechanisms for airbag deployment.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
capturing, using one or more sensors, positional information relating to at least one driver hand position on a steering wheel;
determining, using a processor, at least one driver hand position with respect to a chamber of a plurality of chambers of an airbag disposed within the steering wheel based on the positional information; and
adjusting deployment of the airbag such that the chamber is not deployed based on the determined driver hand position.

2. The method of claim 1, wherein:
said capturing comprises detecting a contact position of the at least one driver hand with respect to a steering wheel; and
said determining comprises determining the contact position of at least one driver hand on the steering wheel.

3. The method of claim 2, wherein said adjusting comprises directing deployment of a chamber such that a chamber substantially proximate to the contact position is not deployed.

4. The method of claim 1, wherein: said capturing comprises capturing an image of the driver hand.

5. The method of claim 1, wherein the determining comprises determining the driver hand position with respect to the chamber does not exceed a predetermined distance.

6. The method of claim 1, wherein the determining comprises determining the driver hand position with respect to the chamber does not match a predetermined orientation.

7. The method of claim 1, wherein the determining comprises determining the driver hand position with respect to the chamber does not match a predetermined orientation; wherein said adjusting deployment of the airbag based on the determined driver hand position comprises shaping deployment of the airbag.

8. The method of claim 1, wherein the one or more sensors comprises an image sensor; and
wherein the image sensor captures positional information relating to two driver hands.

9. A vehicle, comprising:
an airbag containing component;
an airbag comprising a plurality of chambers therein;
a driver compartment having a seat and a steering wheel;
one or more wheels, at least one of said wheels operatively coupled to said steering wheel;
a motor that provides motion to the one or more wheels;
one or more sensors that provides input relating to at least one driver hand;
a processor operatively coupled to the one or more sensors and the airbag; and
a memory device that stores instructions accessible to the processor, the instructions being executable by the processor to:
capture, using the one or more sensors, positional information relating to the at least one driver hand on the steering wheel;
determine a driver hand position with respect to a chamber of the plurality of chambers of the airbag disposed within the steering wheel based on the positional information; and
adjust deployment of the airbag such that the chamber is not deployed based on the determined driver hand position.

10. The vehicle of claim 9, wherein:
to capture comprises detecting a contact position of the at least one driver hand with respect to the steering wheel; and
to determine comprises determining the contact position of at least one driver hand on the steering wheel.

11. The vehicle of claim 10, wherein the chamber is substantially proximate to the contact position.

12. The vehicle of claim 9, wherein:
to capture comprises capturing an image of the driver hand; and
to determine comprises determining the position of the driver hand with respect to the airbag containing component.

13. The vehicle of claim 9, wherein to determine comprises determining the driver hand position with respect to the airbag containing component does not exceed a predetermined distance.

14. The vehicle of claim 9, wherein to determine comprises determining the driver hand position with respect to the airbag containing component does not match a predetermined orientation.

15. The vehicle of claim 9, wherein to determine comprises determining the driver hand position with respect to the airbag containing component does not match a predetermined orientation;
wherein to adjust deployment of the airbag based on the determined driver hand position comprises shaping deployment of the airbag.

16. The vehicle of claim 9, wherein the one or more sensors comprises an image sensor; and
wherein the image sensor captures positional information relating to two driver hands.

17. An information handling system, comprising:

a processor;

a memory device operatively coupled to the processor, wherein the memory device stores instructions accessible to the processor, the instructions being executable by the processor to:

capture, using one or more sensors, positional information relating to at least one driver hand position on a steering wheel;

determine at least one driver hand position with respect to a chamber of a plurality of chambers of a chambered airbag disposed within the steering wheel based on the positional information; and adjust deployment of the chambered airbag such that the chamber is not deployed based on the determined driver hand position.

18. A method, comprising:

capturing, using an image sensor, positional information relating at least one driver hand position on a steering wheel;

determining, using a processor, at least one driver hand position with respect to an airbag containing component based on the positional information;

wherein the airbag comprises a plurality of chambers; and adjusting deployment of the airbag such that select chambers are not deployed based on the determined driver hand position.

\* \* \* \* \*